(12) United States Patent
Castaneda Melo et al.

(10) Patent No.: US 11,177,882 B2
(45) Date of Patent: Nov. 16, 2021

(54) RECEIVER FOR LOW-POWER OPTICAL SIGNALS WITH OPERATION IN CONDITIONS OF HIGH INCIDENCE OF BACKGROUND LIGHT AND APPLICATION IN VISIBLE LIGHT COMMUNICATION

(71) Applicant: UNIVERSIDAD ANTONIO NARIÑO, Bogota (CO)

(72) Inventors: Luis Fernando Castaneda Melo, Meta (CO); Javier Fernando Castano Forero, Meta (CO); Rafael Maria Gutierrez Salamanca, Bogota (CO)

(73) Assignee: UNIVERSIDAD ANTONIO NARIÑO, Bogota (CO)

( * ) Notice: Subject to any disclaimer, the term of this patent is extended or adjusted under 35 U.S.C. 154(b) by 0 days.

(21) Appl. No.: 16/962,490

(22) PCT Filed: Jan. 4, 2019

(86) PCT No.: PCT/CO2019/000001
§ 371 (c)(1),
(2) Date: Dec. 10, 2020

(87) PCT Pub. No.: WO2020/020387
PCT Pub. Date: Jan. 30, 2020

(65) Prior Publication Data
US 2021/0250088 A1   Aug. 12, 2021

(30) Foreign Application Priority Data

Jul. 25, 2018   (CO) .......................... NC2018/0007716

(51) Int. Cl.
*H04B 10/116* (2013.01)
*H04B 10/60* (2013.01)

(52) U.S. Cl.
CPC ........... *H04B 10/116* (2013.01); *H04B 10/60* (2013.01)

(58) Field of Classification Search
CPC .............................. H04B 10/116; H04B 10/60
(Continued)

(56) References Cited

U.S. PATENT DOCUMENTS 9,945,965 B2 * 4/2018 Fu ........................ G01T 1/2018
10,557,940 B2 * 2/2020 Eichenholz ............. G01S 17/42
(Continued)

FOREIGN PATENT DOCUMENTS

CN           101752391 B       6/2010
GB             2451678 A       2/2009

OTHER PUBLICATIONS

P. M. Butala, J. C. Chau, and T. D. C. Little. Metameric modulation for diffuse visible light communications with ambient lighting. In 2012 International Workshop on Optical Wireless Communications, IWOW 2012, constant 2012.
(Continued)

*Primary Examiner* — Dalzid E Singh
(74) *Attorney, Agent, or Firm* — Hoglund & Pamias, PSC; Roberto J. Rios

(57) ABSTRACT

The invention relates to an optical receiver for digital signals in the visible range, with a photodetector consisting of a two-dimensional array of avalanche photodiodes (APD),
(Continued)

connected in parallel and with an output representing the sum of the individual responses of each APD. The photodetector requires a low on incidence power and therefore allows to detect specific optical signals in a very well-defined range of powers and frequencies, in real high intensity back light conditions without the requirement of optical filters, which allows a great advance in the utility and applicability of communication with visible light with digital modulation techniques.

8 Claims, 3 Drawing Sheets

(58) Field of Classification Search
USPC .......................................................... 398/118
See application file for complete search history.

(56) References Cited

U.S. PATENT DOCUMENTS

| 2009/0224158 | A1 | 9/2009 | Haselman et al. | |
|---|---|---|---|---|
| 2013/0015331 | A1 | 1/2013 | Birk et al. | |
| 2015/0282749 | A1 | 10/2015 | Zand et al. | |
| 2015/0285922 | A1* | 10/2015 | Mintzer | A61B 6/4241 600/411 |
| 2016/0182902 | A1* | 6/2016 | Guo | H04N 5/341 348/301 |
| 2018/0164446 | A1* | 6/2018 | Zhao | G01T 1/208 |
| 2020/0366381 | A1* | 11/2020 | Van Weeren | H04B 13/02 |

OTHER PUBLICATIONS

R. M. Gutierrez, A. I. Hernandez, L. F. Castaneda, and J. F. Castaño. The silicon photomultiplier as a metasystem with designed electronics as metadevice for a new receiver-emitter in visible light communications. In Proceedings of SPIE—The International Society for Optical Engineering, vol. 9544, 2015.

H. Haas. Lifi is a paradigm-shifting 5g technology. Reviews in Physics, 3:26-31, 2018.

H. Haas, C. Chen, and D. O'Brien. A guide to wireless networking by light Progress in Quantum Electronics, 55:88-111, 2017.

H. Li, X. Chen, J. Guo, and H. Chen. A 550 mbit/s real-time visible light communication system based on phosphorescent white light led for practical high-speed lowcomplexity application. Optics Express, 22(22):27203-27213, 2014.

D. Tsonev, S. Videv, and H. Haas. Towards a 100 gb/s visible light wireless access network. Optics Express, 23 (2):1627-1637, 2015.

S. Yang, H. Kim, Y. Son, and S. Han. Reduction of optical interference by wavelength filtering in rgb-led based indoor vlc system. In 16th Opto-Electronics and Communications Conference, OECC 2011, pp. 551-552, 2011.

T. Aimin et al.. Design and Implementation of an Integrated Visible Light Communication and WiFi System. 2018 IEEE 15th International Conference on Mobile Ad Hoc and Sensor Systems (MASS), Oct. 9, 2018 IEEE. Sep. 10, 2018, pp. 157-165.

R. Gutierrez et al.. An optical Network Communication System performance using Silicon Photo Multipliers (SiPM). 2018 20th International Conference on Transparent Optical Networks (ICTON), Jul. 1, 2018 IEEE. Jan. 7, 2018, pp. 1-4.

* cited by examiner

RECEIVER FOR LOW-POWER OPTICAL SIGNALS WITH OPERATION IN CONDITIONS OF HIGH INCIDENCE OF BACKGROUND LIGHT AND APPLICATION IN VISIBLE LIGHT COMMUNICATION

FIELD OF THE INVENTION

The present invention belongs to the field of application of visible light communication systems, which require specific conditions of operation such as operating with white LED, optical power that does not affect the users and tends to be low, operation with background light and high transfer rates.

The invention is directed to the reception of communication signals with improvements on the operating conditions using a white LED, an optical power and operation with back light as mentioned before and with an adequate performance in terms of high transfer rates.

BACKGROUND OF THE INVENTION

Wireless communications are high impact technologies in society, enclosing home and business users. In recent years the number of users of this type of systems has increased exponentially, with Wi-Fi on top for communications in closed spaces and short distances where security and privacy are important. In 2016, the number of users of this type of systems exceeded 3 billion worldwide, being one of the largest markets today. Wi-Fi and wireless systems, feature problems due to possible health risks and limitations in bandwidth and performance.

The communications industry will greatly appreciate a substitute technology for some critical environments, as well as the exponentially growing number of radio frequency connections that can quickly saturate the available spectrum. Therefore, and trying to solve these problems for the last few years, a communication alternative has been under development that uses white LEDs or the visible range of light in general as transmitters and, at the same time, as lighting systems. Said developments are commonly known as Visible Light Communications (VLC), among which, however, there are important challenges to overcome in order to meet the real requirements of the user and the market and become a viable alternative technology for radiofrequency communications. Some of the most relevant aspects to improve VLC technology are to increase transfer rates, reduce the intensity of light required to transmit in standard lighting conditions and achieve communications between multiple users.

In summary, the optical receivers currently used in VLC feature three aspects that can and should be improved: 1) Increase the transfer rate, an important parameter in communication systems and which current necessities demand that it be as high as possible; 2) Reduce the required optical power, and 3) Operation of the communication system in presence of back light without the need to use optical filters and mitigating the effect caused by interference that may alter the communication.

The visible light communication (VLC) is a technology that in recent years has increase its growth as an alternative to other wireless communication systems such as Wi-Fi, Bluetooth and the like, especially in the case of WPAN (Wireless Personal Area Network) a particular case of LAN (Local Area Network).

The VLC systems developed mainly use the IM/DD (Intensity Modulation-Direct Detection) technique for transmission and reception, for which the intensity of a LED or an arrangement of LEDs is controlled through voltage setup, generating signals that can be square, sinusoidal or other waveforms depending on the type of modulation used; for reception, a receiver based on a photodetector is used, which transduce the received photons into electrical signals that are then adapted by analog electronic systems and finally demodulated to recover the information initially transmitted.

VLC systems have common features that distinguish them from other wireless communication technologies such as: 1) The carrier used is visible light in the range of 350 nm to 750 nm; 2) Currently, white LEDs are employed as transmitters, in such a way that this type of lighting is used for a double purpose; 3) It requires line of sight to ensure the best reception, and this implies communication problems due to obstacles; 4) It requires the mitigation of the effect produced by the environmental and artificial back light on the receivers; it does not present problems of electromagnetic interference and for this reason it can be used in scenarios where radiofrequency is restricted, such as hospitals, airplanes, industries and the like; 5) It offers security advantages by restricting communication to the coverage area of visible light, which by its nature has a spread of a few meters and thus prevents the access of unauthorized users to the communication system; 6) It is necessary to solve the problem of interference between users in the case of multiple access and develop efficient techniques to provide access to multiple users and to be able to build a VLC-network.

One of the main challenges of VLC is to operate under a high incidence of back light coming from multiple sources such as lamps, sunlight and any visible light source or radiation within the spectral range of the receiver. Different techniques have been analyzed to mitigate the effect of this background radiation, such as the use of RGB color LED emitters and the use of optical filters. So far, VLC systems have had limitations related to the transfer rate, the ambient operating conditions, the operating distance and the modulation technique, as well as dimming the signal (light). Some VLC products have already been developed, the Fraunhofer Institute in Germany owns a commercial implementation of VLC achieving a transfer rate of 3 Gbps, and a reduced version that reaches 500 Mbps, for a maximum operation distance of 4 m using infrared LED light that requires the use of optical filters to avoid the influence of sunlight or conventional lighting.

In March 2016, pureLiFi introduced its Li—X system with small user and operation devices via USB, a transfer rate of 40 Mbps on both channels and multiple access through the concept of attocell.

On the other hand, Arxtek developed a VLC system called MOMO, which uses RGB LED and RGB photodetectors, based on Wavelet Division Modulation (WDM). This system reaches transfer rates of up to 300 Mbps, a maximum operation distance of 12 m, a connection between point-to-point users with a dedicated transmitter and receiver and multiple access through the interconnection of these devices. A comparative summary of these developments is presented in Table 1 (Binary file transfer conditions and reported performance. Transfer Rate (TR), modulation and communication link for the referenced VLC systems).

TABLE 1

|  | Li-Flame | Li-X | VLC Fraunhaufer | MOMO |
| --- | --- | --- | --- | --- |
| Transfer Rate | 10 Mbps | 40 Mbps | 1 Gbps | 300 Mbps |
| Modulation | OFDM | OFDM | OFDM | RGB-WDM |
| Uplink LED | InfraredLED | Infrared | Infrared | RGB |
| DownlinkLEDI | White LED | White | Infrared | RGB |
| Light | optical filter | filter | optical filter | optical filter |

Taking into account the above characteristics, research and development based on photodetectors is important for VLC systems, in terms of improving the receivers that are required in this type of communication. To achieve communication performance in the presence of back light, the use of optical filters has been proposed, which however limits the influence of this type of light on the receivers, in addition to optical systems that collects the greatest amount of light and take it towards the photodetector.

The photodetectors used in present days communication systems operating with visible light are based on PIN photodiodes, APD (Avalanche Photodiode) and the recently developed SPAD (Single-photon Avalanche Diode) arrays with a digital architecture that are in the evaluation stage. However, these developments lack of robustness with ambient back light, without optical filters, and they feature a reduction of the optical reception power up to the order of $\mu W/cm^2$. These photodetectors are highly affected by ambient and natural back light, which reduces their ability to respond to communication signals.

The APD arrangements in which the output is of analog type have been applied in the detection of small amounts of light, in applications such as positron emission tomography, spectrometry, distance measurement, densitometry, cytometry and mainly in high-energies physics experiments.

Different experiments developed with photodetectors formed by arrangements of APD and analog output, demonstrated their high response capacity in the presence of ambient back light and their high responsivity that allows them to detect low light fluxes which appear to be novel characteristics in the state of the art of photodetectors as well as communications with visible light.

Some of these applications are known, for example, from developments such as the one proposed by document US20090224158 "Data acquisition for positron emission tomography", which refers to a matrix detector similar to the readout of a MPGD 3GEM which detects a pulse of light of a positron emission generating an analog electrical pulse captured in the corresponding channels to then digitalize it and measure the energy of the pulse. The parts of this detection system are: 1) Detector, 2) Low-pass filter, 3) Digitizer and 4) Embedded system for load and energy analysis. Such development, however, generates analogous pulses, which leads to problems in the accuracy of the readings. Additionally, the low-pass filter of such development presents a very low performance in the digitalization and the load or energy analysis system.

On the other hand, document US20150282749 "Apparatus, systems and methods for mapping of tissue oxygenation" presents a system for making imaging of tissues, organs or any internal biological structure, for which structure images are captured and, at the same time, measures with an optical system the level of oxygen present in the area of study. The physical principle can be fluorescence or any other similar. The oxygen level directly produces an optical emission that is detected with the photodetector system. In the main embodiment of such development, the system is a CCD camera and discloses that in an expanded way it can use another type of photodetectors. In this case, what is intended to be detected is a response to a specific event, and it is not about the demodulation of information, nor about having information represented digitally.

In this development, devices with oxygen detection are also used, so that their optical response depends on oxygenation, such purpose makes measurement and subsequent response very complex.

Another important development is the one disclosed in document CN101752391 entitled "Snow slide drifting detector with MOS fully-depleted drifting channel and detecting method thereof" which discloses a technique that improves the response, efficiency, gain and other parameters of a photodetector. Such development, however, is designed to detect X-rays, gamma rays and is sensitive to a wave band from blue light to infrared light.

Lastly, document US2013015331A1 entitled "Device and Method for detecting Light" refers to an electronic system and signal processing to detect light signals, with different applications. In this development the functional explanations are given with regard to APD. In said patent the operation for communications is not explicitly explained and the operation with back light is not mentioned. Additionally, in the document, the device requires another component to detect light, such as a microscope, a spectrometer or a camera.

SUMMARY OF THE INVENTION

The receiver of the present invention contributes surprisingly and simply in the solution to these problems.

To solve these problems, the inventors designed an optical receiver for digital signals in the visible range of light, which requires low incidence power and therefore allows to detect specific optical signals in a very well-defined range of powers and frequencies, in real high-intensity back light conditions without the requirement of optical filters, taking advantage of the features of the photodetector boundary technology, which allows a great advance in the usefulness and applicability of communication with visible light with digital modulation techniques.

The VLC technology of the present invention overcomes some of the limitations of the foregoing developments by the integration of Silicon Photo Multipliers devices (SiPM), an advanced detection technology initially developed for high-energy particle experiments, for example, through the detection of photons generated from their disintegration by collisions. A SiPM is a set of avalanche photodiodes (APD) grouped in a matrix pattern and electrically connected in parallel. One of its main features is a gain of the order of $10^6$, which gives it an extremely high sensitivity. By integrating SiPM into the receiving system of the present invention, optical filters are no longer necessary due to their greater sensitivity compared to all the technologies cited in Table 1.

Likewise, the greater sensitivity of SiPM allows to clearly discriminate the noise signal, making it possible to use simple modulation techniques such as On Off Key (OOK) while maintaining competitive transfer rates.

On the other hand, existing technologies use more complex modulation techniques to achieve comparable transfer rates; in fact, the only technologies with higher reported transfer rates than VLC technology require infrared or RGB emitters.

DETAILED DESCRIPTION OF THE INVENTION

Figure 1:
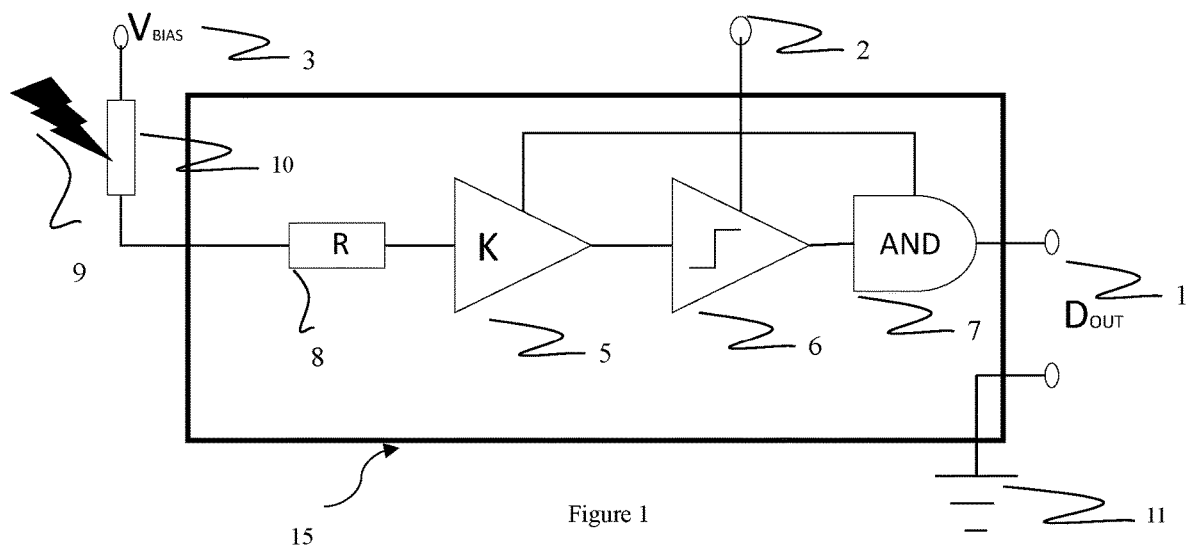
FIG. 1 shows an optical receiver for linear communication.

In order to overcome these problems, the inventors have developed an optical receiver for digital communication of the present invention which is illustrated in FIG. 1 and comprises a photodetector (10) of high sensitivity and response in the visible range, formed by an APD array (13), capable of responding in the presence of back light, positioned to receive a visible light beam (9) from an optical transmitter.

Figure 2:
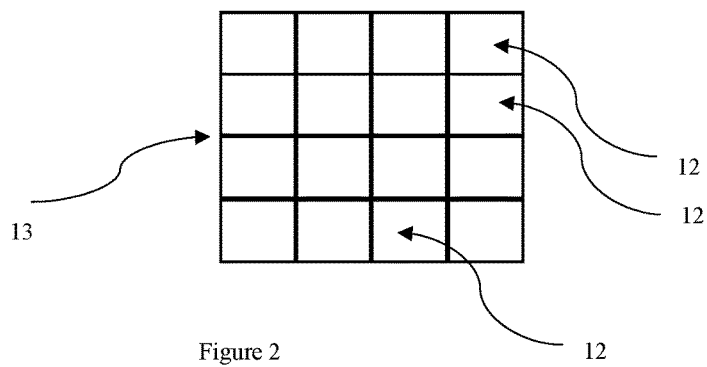
FIG. 2 shows an APD array and incidence of photons.

FIG. 2 shows the structure of the array (13) formed by the APD, which is located in two-dimensional matrix form, and may be impacted by photons (12) on any of the APD that comprise it.

Figure 3:
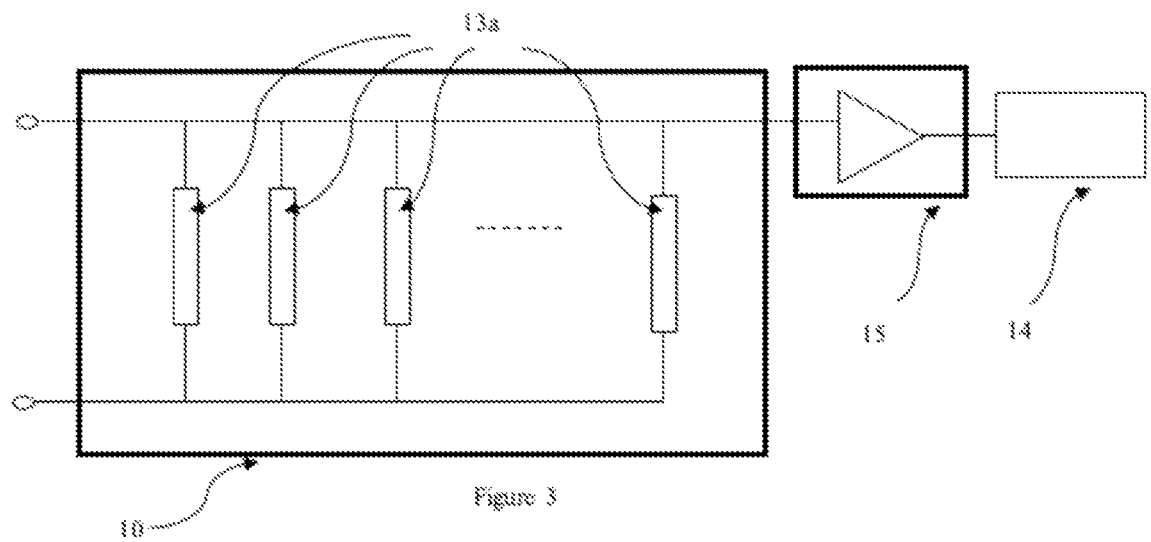
FIG. 3 shows the electric equivalent of the APD Array.
Figure 4:
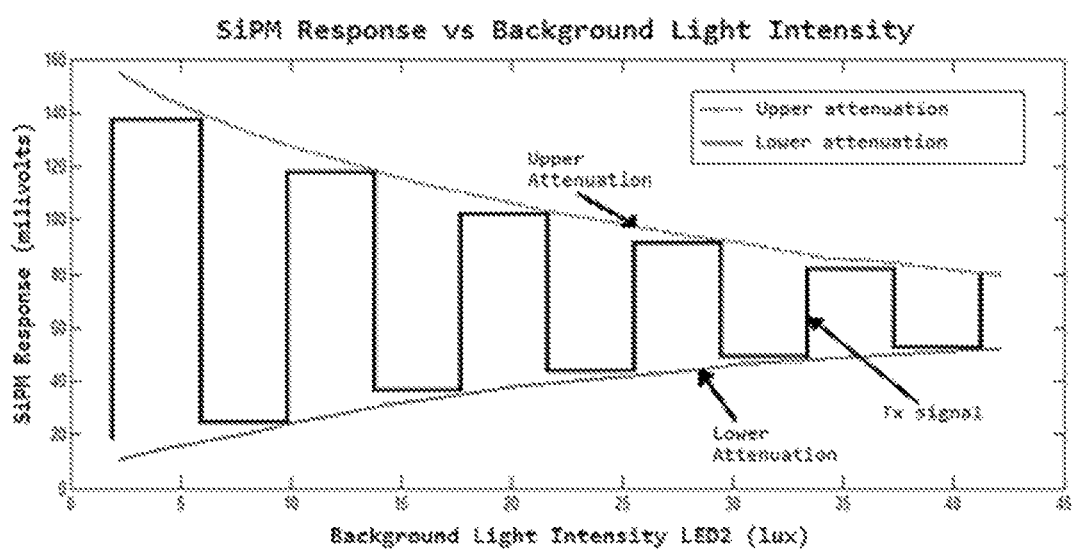
FIG. 4 shows a plane illustrating the response of the luminous flux impinging on the photodetector against the back-light intensity.

FIG. 3 shows the electrical equivalent of the APD array (13), whose output consists of the sum of the responses of the APDs (13a) activated by the incident photons.

The output of the photodetector (10) consisting of an electric charge as a non-linear function of the illuminance on the photodetector (10) and in turn is conditioned by the response of this element, is connected to a specifically designed analog electronic system (15) according to the characteristics of the response of the photodetector (10).

The electronic system (15) has as an input the photodetector output (10), which is connected to a load resistance (8) to generate a voltage as a non-linear function referenced in FIG. 1 of the luminous flux impinging (9) on the photodetector (10), taking into account a compensation of the level of offset generated by the back light and the attenuation of the signal as a result of the saturation of the SiPM at higher levels of luminous flux.

The resistor (8) is connected to an amplification stage (5) conformed by operational amplifiers or any high frequency electronic device that amplifies signals; the purpose of this connection is to amplify the voltage generated in the resistor (8) maintaining the frequency characteristics of the signal transduced by the photodetector (10).

The output of the amplification stage (5) is connected to a comparison stage (6) conformed by operational amplifiers or any similar device. The comparison stage is configured to generate signals in the required range by the demodulation system (14) to which the receiver is connected.

Finally, the comparison stage is connected to a stage (7) consisting of operational amplifiers and which implements an AND logic function between the output of stage (7) and a reference value, determined by the levels required by the demodulation system (14) to which the receiver is connected.

These stages are connected to a voltage source (2) that provides the required voltages. The output (1) of the receiver is digital, in the levels determined by the characteristics of stages (5), (6) and (7).

An ideal characteristic for visible light communication systems is having high sensitivity, which conditions the optical power required. With the optical receiver of the present invention, the systems can operate from normal lighting/transmission conditions, taking into account the dual purpose use of the LED systems, up to imperceptible to the human eye lighting levels, for example, the system could be used at times when no lighting is required; the fact of not requiring optical filters to mitigate the impact of ambient background light is a factor that brings us into less complexity and implementation costs.

According to the above the optical receiver of the invention fulfills the objectives of communication with visible light, operating with natural and artificial back light; as well as the low optical power required. This allows the system to have the following advantages:

1. Operation with ambient back light without optical filters.
2. Operation with lower incident optical power.
3. Simplicity of the electronic systems necessary for its operation.

EXAMPLE

Figure 5:
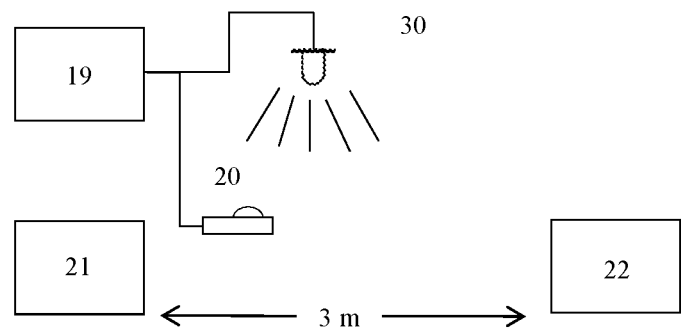
FIG. 5 shows an experimental configuration of visible light communication (VLC) with two clients.

The experimental configuration and methodology were conceived to test a SiPM based technology for Visible Light Communication (VLC) system consisting in two clients (21 and 22), a back-light control (19) and a monitoring system (20) as shown in FIG. 5.

The back-light control system is composed of a white LED lamp (19), an ambient light sensor (20) and a current control used to regulate LED lamp emission intensity.

Figure 6:
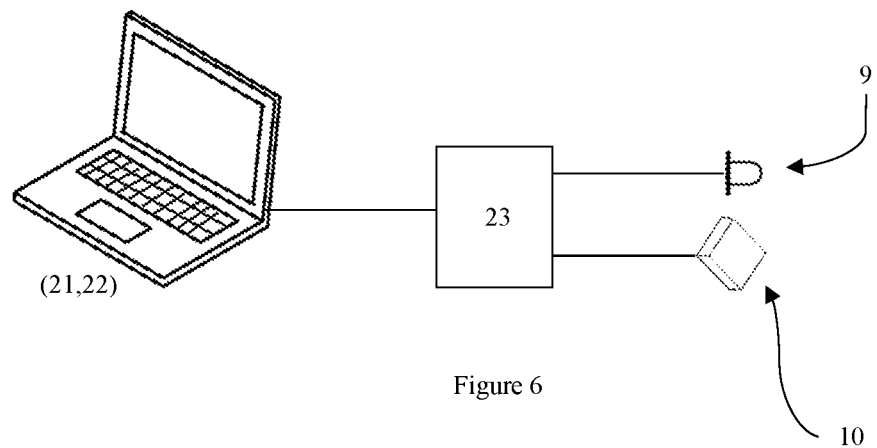
FIG. 6 shows the components of each client system in visible light communication (VLC).

Each client system is composed of a white LED emitter (9), a SiPM based receptor (10), a FPGA signal conditioning and protocoling device (23) and a computer, this is illustrated in FIG. 6.

Both clients (21 and 22) are placed on a horizontal plane at a distance of 3 m between them without obstacles as illustrated in the scheme of FIG. 5. The back-lighting source (30) is placed at an equal distance from each client with an emitting angle of 90 degrees with the horizontal plane. The LED emitters and the back-light LED lamp emit in the same frequency range to increase the challenge of differentiating signal noise. The SiPM based receptor is composed by a SiPM detector, a low-pass signal filter and a conformation stage.

The testing method is divided into two main steps. The first step is designed to adjust the VLC system to operate under standard working conditions. In this step, the VLC emitter and receptor systems are tested to evaluate the actual attenuation effect of the back light that could affect the effective transfer rate. In the second step, the VLC system is tested for data transfer between two clients.

For the first step, the emitter is stimulated with a 100 MHz square signal and a back-light lighting intensity set to a reference value corresponding to the lower level required in an office working environment (300 lx), to evaluate the attenuation due to the back light. The SiPM response amplitude relative to the back light is normalized after the signal filtering stage, and it is taken as reference to establish the signal attenuation level. The back-light intensity is increased by steps of 5 lux, and SiPM response mean amplitude voltage is recorded. The SiPM mean amplitude voltage after the filtering stage versus the back-light intensity is plotted on a semi-logarithmic scale and the attenuation function of the signal in relation to the back light is established with a fitting function. This function will be used to estimate the signal level and the signal-to-noise ratio (SNR) in different lighting conditions, providing useful information to tune the VLC emitter receptor device and establishing operational limits for the technology.

Once the signal attenuation is estimated in the maximum lighting conditions (600 lux), the signal conditioning system is tuned. For this purpose, the modeler threshold (Vth) is set at a value such that $$Vlrip_{max} < Vth < Vmrip_{min}$$

Where $Vlrip_{max}$ is the maximal ripple voltage at the lower part of the signal and $Vmrip_{min}$ is the minimum ripple voltage at the upper part of the signal.

The system is tested by transmitting a binary file using an On Off Key modulation technique (OOK) from one client to the other, under variable ambient back light conditions, and evaluated for the transmission performance by measuring the global transfer rate of a binary file between two users. Ambient lighting conditions are set at the upper limit of the fixed range to test the worst possible scenario corresponding to a normal office working environment. The experiment was performed several times to have statistical consistency, the transfer rate was measured for all repetitions obtaining a consistent mean value with a small standard deviation.

In the current experimental setup with SiPM based receiver, it demonstrated the feasibility of VLC technologies that operate under standard office work conditions; this is due to the sensitivity of the SiPM that provides sufficient robustness for the transmission of information in back lighting conditions of standard office workplaces (unpublished data).

The SNR reported after the filtering stage proves to be sufficient to achieve an adequate reconstruction of a square signal with the use of a modeling function based on the easy-to-perform threshold.

The results of the present invention compared with the existing technology presented in Table 1 show that none of the existing technologies performs transfer rates in the 100 MHz ranges without using optical filters.

Likewise, all existing technologies used more complex modulation techniques than OOK, which means that if the proposed technology implements more efficient modulation techniques, their transfer rates can increase substantially.

The results obtained show that a VLC technology based on SiPM is capable of transmitting information at a transfer speed comparable to that of existing technology, using OOK modulation, a simple technique that requires less computing resources and ensures small error rates, with the additional advantage of avoiding the need for optical filters or complex coding protocols.

The invention claimed is:

1. An optical receiver for visible light communication, comprising:
    a Silicon Photo Multiplier (SiPM) photodetector (10) consisting of an Avalanche Photodiodes (APD) array (13) having a plurality of APDs connected in parallel with an output delivering a sum of individual outputs of each APD;
    a load resistance (8) connected to the output of said SiPM photodetector (10), said load resistance (8) generates a voltage drop proportional to an output current of said SiPM photodetector (10);
    an amplification stage (5) connected to an output of said load resistance (8), said amplification stage (5) amplifying the output of said load resistance (8) with a gain and characteristics that depend on a response of the SiPM photodetector (10);
    a voltage comparator (6) connected to the output of the amplification stage (5), wherein a reference voltage used is determined by an output level of the receiver and characteristics of a digital demodulation stage (14); and
    an analog stage (7) connected to an output of said voltage comparator (6), said analog stage (7) operating as an AND logic gate in order to guarantee digital values defined according to the characteristics of the digital demodulation stage (14) to which said receiver is connected.

2. The optical receiver of claim 1, wherein said APD array (13) detects information in optical pulses within ambient optical radiation.

3. The optical receiver of claim 1, wherein the amplification stage (5) is formed by operational amplifiers.

4. The optical receiver of claim 1, wherein the voltage comparator (6) is implemented with an operational amplifier.

5. The optical receiver of claim 1, wherein the load resistor (8) generates a voltage variation proportional to a luminous flux impinging on the SiPM photodetector (10).

6. The optical receiver of claim 1, wherein the amplification stage (5) amplifies the response of the SiPM photodetector (10).

7. The optical receiver of claim 1, wherein the digital demodulation process (14) digitizes demodulation information to which the receiver is connected.

8. The optical receiver of claim 1, wherein said analog stage (7) comprises an operational amplifier that generates two voltage values corresponding to digital values 1 and 0 that constitute an output of the receiver to transmit information to a standard communication system.

\* \* \* \* \*